June 6, 1950 E. E. ANDREWS 2,510,538
TERMINAL AIR BRAKE TIME TESTING DEVICE
Filed Dec. 19, 1947 2 Sheets-Sheet 2
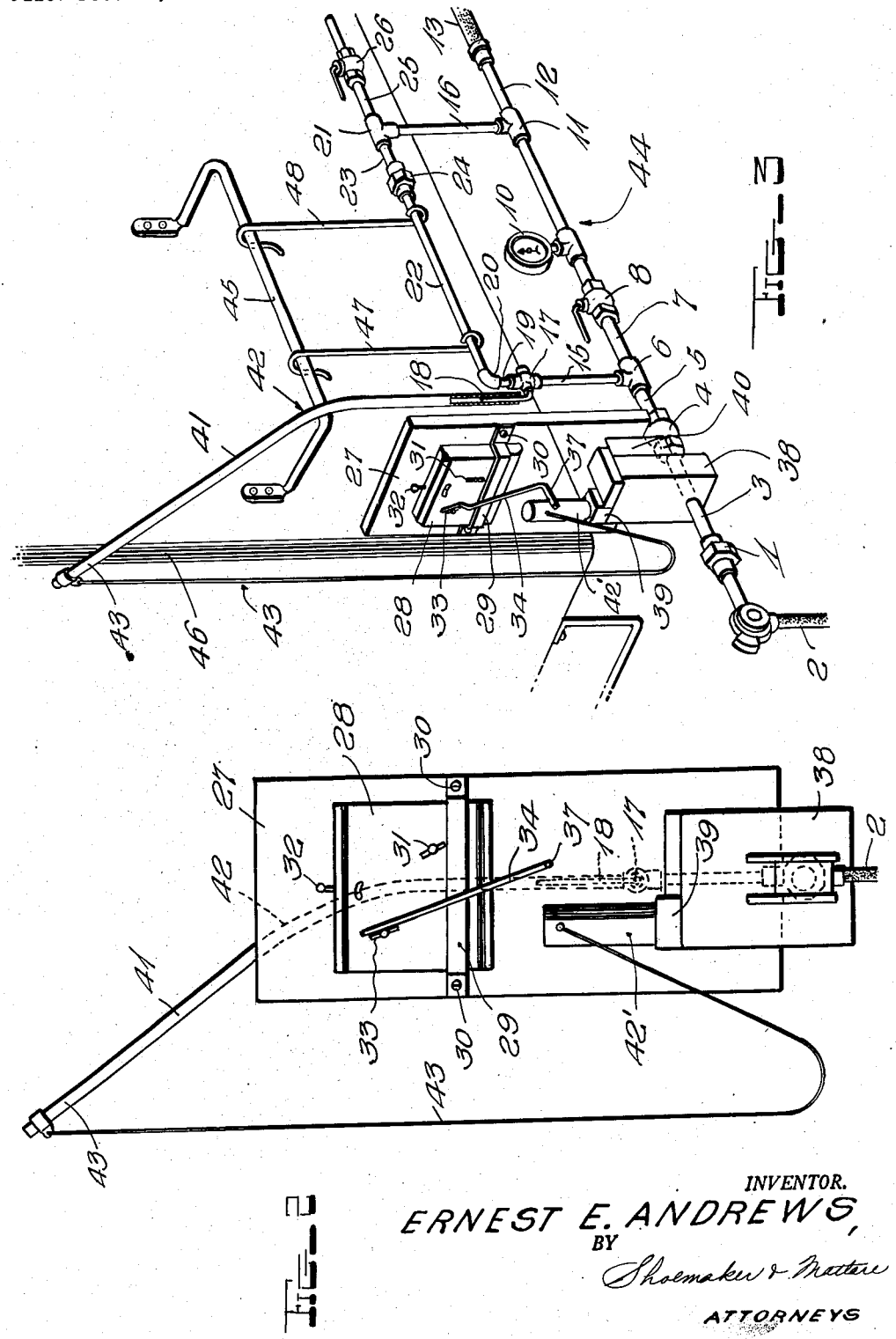
INVENTOR.
ERNEST E. ANDREWS,
BY
Shoemaker & Mattare
ATTORNEYS

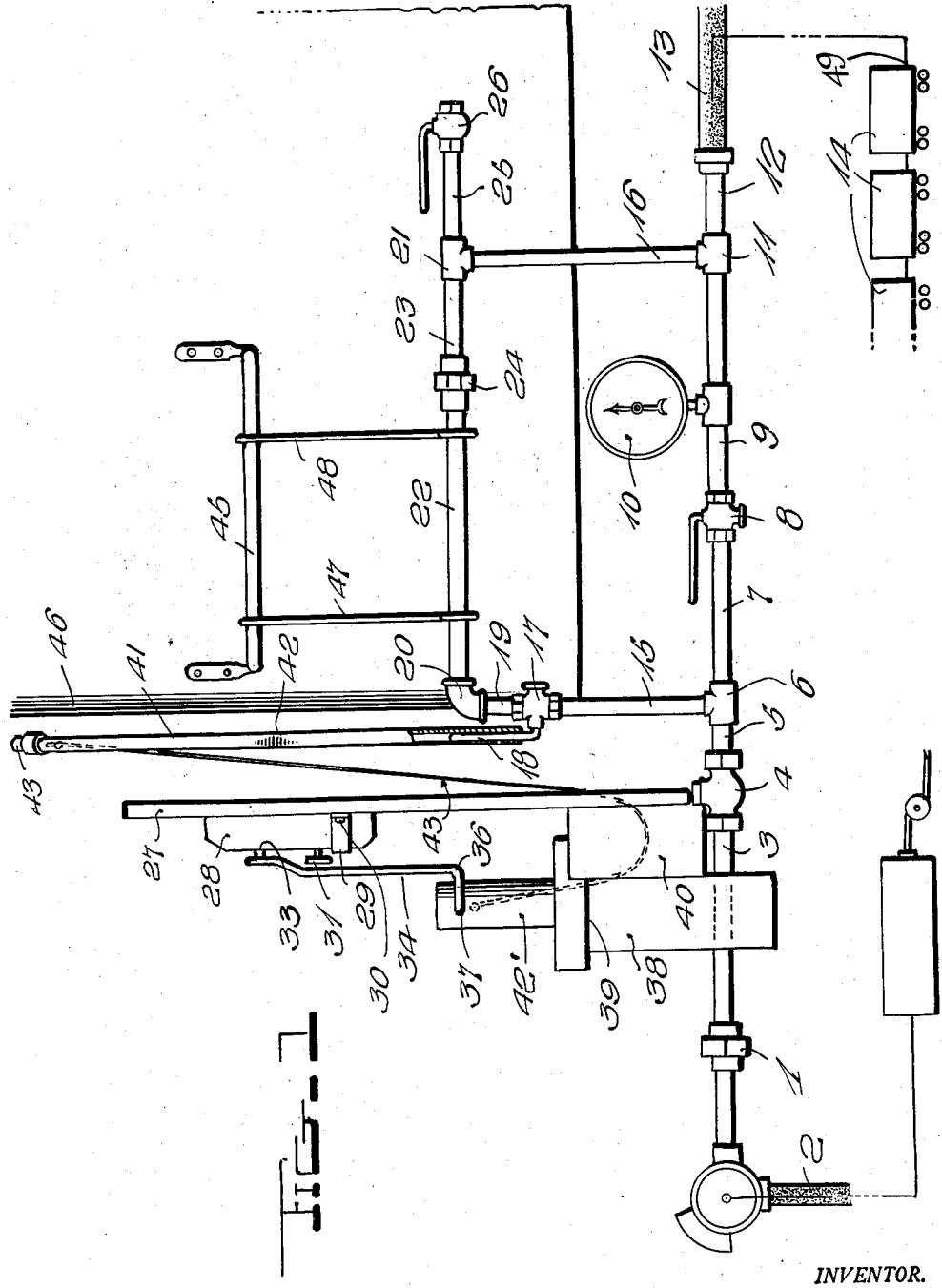

Patented June 6, 1950

2,510,538

UNITED STATES PATENT OFFICE 2,510,538

TERMINAL AIR BRAKE TIME TESTING DEVICE

Ernest Edward Andrews, Richmond, Va.

Application December 19, 1947, Serial No. 792,756

6 Claims. (Cl. 73—39)

My invention relates to a testing apparatus. The invention is directed to testing the airbrakes of railroad trains. More particularly, the invention relates to time controlled apparatus for testing railroad car brakes.

In general, the airbrake system of railway car brakes includes an auxiliary reservoir for air under pressure, pneumatic plungers, triple valves, retaining valves and a brake pipe interconnected in a known way to operate brakes of a car. In use, the brake pipes of the several cars of the train are interconnected by means of flexible coupling hoses to provide a continuous air passage, known as the train pipe, extending from the locomotive to the last car of the train. In the locomotive, is the usual engineer's brake valve controlling a main reservoir of compressed air and, at the rear end of the train, the train pipe is closed.

This system is charged with air at normal brake operating pressures, that is about 60 pounds pressure. This normal operating pressure of 60 pounds retains the brakes of all the cars in the train in released position. Consequently, when the pressure in the train pipe is reduced, the brake apparatus on the cars operates to apply all of the brakes of the train, the brakes remaining in the applied position until the pressure in the train pipe is restored to its normal value. This control of the air pressure within the train pipe is effected in the usual manner through the engineer's brake valve or the emergency brake applying device located in each car, in the case of passenger trains.

When a train is made up at a terminal, and on some occasions, when the several cars are in the shop for repairs, it is necessary that the brakes of each car be tested and inspected. In making such a test, a testing apparatus is usually employed that is connected with a supply of compressed air and has valve means associated therewith to charge the train pipe with air under normal operating pressure. The testing apparatus usually includes gauges to determine the pressure within the train pipe and also to assist in determining whether or not the rate of leakage within the train pipe, if any, exists, is within permissive tolerances.

In utilizing testing apparatus of the known patented prior art, it is necessary that considerable time be consumed in making the tests since some such apparatus are so arranged that it is necessary for the inspector to travel the length of the train four times in order to check whether the brakes are properly applied and properly released by the testing apparatus. Furthermore, such arrangements have the drawback that such arrangements include special type fittings, expensive diaphragm valves, spring actuated pistons and spring actuated brake releasing valves, thereby adding to the cost of such testing apparatus and shortening the life thereof and increasing the maintenance since the complicated valve arrangements and the several spring devices require constant care and attention to maintain them in proper operating condition. Further, such prior known devices rely upon the pressure within the train system and the pressure applied by the testing apparatus to operate the brake releasing valve. Consequently, proper operation of this valve is dependent upon the condition of the various complicated and expensive valves existing in the testing apparatus and also upon the condition and rate of leakage in the train pipe itself. In one such known device, it is necessary for the inspector to bleed the train pipe line to effect the operation of the brake releasing valve of the testing apparatus.

My invention eliminates the drawbacks of the known arrangements, does not require any special valves or fittings, is not dependent upon the pressure in the system or the pressure supplied to the system for effecting the operation of the brake releasing valve. Consequently, the testing apparatus built according to my invention is less expensive than known devices, requires practically no upkeep the parts being of standard fittings are readily replaceable, and the operating means for the brake releasing valve is entirely independent of the pressure in the train pipe on the testing system.

Accordingly, one of the objects of my invention is to provide a relatively simple, inexpensive, lightweight, portable testing apparatus for testing the airbrakes of railroad trains and having a control for the brake release valve operating independently of the air pressure in the air brake system.

Another object is to provide this independent control in the form of time control means.

Another object is to provide relatively simple supporting means for supporting the apparatus in position on any railroad car without making any alteration in the usual structure of the car.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a side elevation of the apparatus with the air supply, the train pipe connection and a train of cars illustrated diagrammatically and on a smaller scale;

Fig. 2 is a front elevation of the time control operating means for effecting the operation of the valve to recharge the train pipe and release the brake;

Fig. 3 is a perspective view of the testing apparatus in its operating position on a freight car.

The invention will be more readily understood by referring to the detailed drawings wherein like reference numerals designate the same parts.

Referring to the drawings, the brake testing apparatus in Fig. 1 is constructed of standard pipe fittings and includes a coupling 1 connected to a source of compressed air indicated generally at 2 and a main air supply line including a section of pipe 3 connected to the coupling 1 and at its other end to a check valve 4. A short length of pipe 5 is connected at one end to the check valve 4 and at its other end to a T-coupling 6. Connected at the opposite end of the T-coupling is a length of pipe 7 having its opposite end connected to a valve 8 for controlling the admission of air to the main line of the testing apparatus. A length of pipe 9 is connected to the outlet side of the valve 8 and an air gauge 10 is provided in this line and extends vertically therefrom.

It will be noted that the operating handle for the valve 8 is so arranged that the inspector, when manipulating this valve, is facing the gauge 10 so that he can easily watch the indications appearing thereon. The other end of this pipe section 9 is connected to one end of a T-coupling 11 and extending from the opposite end of this T-coupling, is a short section of pipe 12 connected to a flexible coupling or to a length of flexible tubing 13 that is suitably connected at its other end to the train pipe leading to the train of cars 14.

The branch line of this testing apparatus includes vertically extending leg members 15 and 16 connected to the T-couplings 6 and 11 respectively, the branch members thus being parallel to one another. A rotary valve 17 is connected in the branch line to the leg member 15 and so arranged that its operating handle 18 is vertically disposed and parallel with the branch line 15 when the valve is in its closed position.

The outlet side of the valve is connected to a short length of pipe 19 to the free end of which is attached an elbow 20. A T-coupling 21 is connected to the upper end of the leg member 16 and between the T-coupling 21 and the elbow 20 is connected pipe sections 22 and 23 connected to each other by the pipe union 24 and extending from the T-coupling 21 is a short length of pipe 25 having a valve 26 connected to its outer end. This valve is the reduction valve for the testing apparatus to effect a service application of the brakes being tested.

As will be apparent from the drawings, the entire arrangement is relatively simple and compact, the pipe sections and valves being so constructed as to present the appearance of a rectangle. The pipe section 25 extending from the T-coupling 21 and the short pipe section 12 extending from the T-coupling 11 are parallel to one another.

In order to automatically actuate the brake releasing valve 17, I provide time controlled mechanism including a panel 27 arranged transversely of the pipe sections of the testing apparatus and spaced from the brake releasing valve 17 and its operating handle 18, the lower end of this panel resting upon the flattened surface of the check valve 4. Upon the face of the panel is mounted a conventional clock work mechanism 28. This clock work mechanism can be retained in position, for example, by means of the metal strap 29 extending across the face thereof and affixed to the panel by means of the screws 30, this clock work mechanism, of course, including a winding key 31, an alarm control 32 and an alarm key 33. Affixed to the alarm key and adapted to rotate therewith is a knocker arm 34. This knocker arm is spaced from the face of the clock work mechanism so that its movement will not interfere with the winding key 35 and its lower end is bent as is 36 to provide a striking foot 37.

Suitable support is provided in front of the panel 27 in the form of a wooden block 38 which is provided with a bore through the lower end thereof through which passes the pipe section 3. This block is provided with a rectangular supporting surface 39 and a spacing block 40 is secured to the block 38 on one side and the panel 27 on its other side so that the panel and the supporting block and table surface form a unitary structure. It will be noted that the lower end of the block 40 rests on the flat upper surface of the connecting end of the check valve 4 so that the panel and supporting surface are fixedly supported in a vertical position.

There is provided a tubular member 41 of a size so that its lower end can be slipped over the vertically extending control handle 18 of the brake releasing valve 17. This member extends upwardly from the control handle and is curved intermediate its ends as at 42 so that its outer end 43 is spaced from the side of the panel 27. The curvature of this member 41 is so arranged that the member becomes a fulcrum for operating the handle 18 of the release valve 17. A weight 42' is supported by the supporting surface 39 and has a flexible strand 43 connected thereto which flexible strand is attached to the upper free end of the tubular member 41, the arrangement being so that, when the alarm key 33 and thereby the knocker arm 34 rotates, the striking foot 37 strikes the weight 41 and knocks it from its support 39. The falling weight, through its flexible strand 43, exerts a vertical pull on the upper end of the tubular member 41 thereby rotating the valve handle 18 from its vertical closed position to a horizontal open position. As is readily apparent, the control means for the brake release valve is thus entirely independent of any pressure in the system, is time controlled by means of the clock work mechanism 28 and automatic in operation.

With reference to Fig. 3 of the drawings, the testing apparatus indicated generally at 44 is supported on the grab bar 45 on the lower end cover of the freight car 46 by the hooks 47 and 48. The flexible conduit 13 is connected to the train pipe at 49. It is apparent that the device could be supported by its supporting hooks from the grab bars 50 or other grab bars on the opposite side of the car depending upon which end of the car was the tail end of the train or which side of the car was nearest the air supply. Further, the apparatus can be supported independently of the car. In addition, the inlet end of the testing apparatus can be connected to the air compressor in the engine and the apparatus can then be supported on the front of the car nearest the engine.

In the operation of the apparatus forming an embodiment of the present invention, the inspector connects the time testing apparatus with the train pipe at 13 and the air supply line 2 manipulates the inlet valve 8 to charge the train pipe to its required operating pressure, closes the valve and watches the gauge 10 in order to determine whether there is any leakage in the train pipe. In the event the leakage is within permissible tolerances, the inspector then manipulates the valve 26 to effect a reduction of 20 pounds pressure in the train pipe in order to seat or apply the brakes. The valve 26 is then closed and the inspector examines the brakes to make sure that all are in proper working order and are in the set position.

The time control means for the valve 17 having been in operation and preset according to the length of the particular train and consequently the time required for the inspector to walk the length thereof while examining the brakes while in their set position, is moving the knocker arm toward the weight 42. When the prescribed interval of time has lapsed, the striking foot of the knocker arm strikes the weight, knocking it from its base 39 and causing the flexible strand 43 to exert a vertical pull on the upper extremity of the tubular member 41 to effect a movement of the valve handle 18 from its vertical closed position to a horizontal open position for the purpose of recharging the train pipe to effect a release of the brakes. The inspector then merely returns the length of the train, examining the brakes to be sure that they are in their released position, and, upon reaching the starting point, it is only necessary for him to disconnect the testing apparatus and render his report.

The embodiment of the invention shown in the accompanying drawings is merely illustrative of the main feature thereof, which is the time control mechanism for effecting a recharging of the train pipes to place the brakes in their released position and it is, of course, understood that various other mechanical arrangements could be utilized for effecting the operation of the brake releasing valve handle so long as the essential time controlling mechanism is present.

While the illustrated embodiment of the invention has been described in detail, it is not intended to limit the scope of the invention described otherwise than by the terms of the following claims.

I claim:

1. An air brake testing apparatus including a supply of compressed air, an air line for establishing communication between said supply and a train pipe of a line of coupled cars whose brake are to be tested, means for controlling the supply of air to initially charge the train pipe to its normal pressure, means for reducing the pressure in the train pipe to apply the brakes and time controlled means to effect a recharging of the train pipe to release the brakes.

2. A portable air brake testing apparatus for testing the brakes of a line of coupled cars of a railroad train and adapted to be interposed between a source of supply for compressed air, and a train pipe controlling the brakes of the line of cars, including manually operated valve means for establishing communication between the source of supply and the train pipe to initially charge the train pipe to its normal operating pressure, means to effect a reduction of pressure in the train pipe to effect a service application of the brakes, and time controlled means for effecting a recharging of the train pipe to release the brakes.

3. An air brake testing apparatus for testing brakes of a line of coupled cars of a railroad train including a source of supply of compressed air, an air line including two branches for effecting communication between the source of supply and the train pipe of the line of coupled cars, manually operated means for controlling the supply of air through one of the branches to charge the train pipe, manually operated valve means in the other branch for effecting a reduction of the pressure in the train pipe, and a service application of the brakes, and automatic time actuated means in this latter branch for controlling the supply of air to effect a release of the brakes and a recharging of the train pipe.

4. An air brake testing apparatus for testing the brakes of a railroad train of the type including a source of supply of compresed air, a valve means for controlling the admission of air to the apparatus to charge the train pipe of the train being tested, valve means to reduce the pressure of air in the train pipe to effect a service application of the brakes of the train being tested, and separate valve means including a control element for recharging the train pipe to effect a release of the brakes, the improvement which consists of clock work controlled, mechanically operated means operatively connected to the control element to automatically move the same to actuate the valve means to effect a release of the brakes and the recharging of the system.

5. An air brake testing apparatus for testing the brakes of a railroad train of the type including a source of supply of compressed air, a valve means for controlling the admission of air to the apparatus to charge the train pipe of the train being tested, valve means to reduce the pressure of air in the train pipe to effect a service application of the brakes of the train being tested, and separate valve means for recharging the train pipe to effect a release of the brakes, the improvement which consists of time control means independent of the pressure within the system for actuating the valve means that effects the release of the brake and the recharging of the system.

6. An air brake testing apparatus for testing the brakes of the coupled cars of a railroad train including a source of supply of compressed air, an air line including two branches for effecting communication between the source of supply and the train pipe of the railroad train whose brakes are to be tested, manually operated means for controlling the supply of air through one of the branches to effect a service application of the brakes, time control means for controlling the supply of air to effect a release of the brakes and means for supporting the apparatus on a car of the train being tested.

ERNEST EDWARD ANDREWS.

REFERENCES CITED

The following references are of record in the file of this patent:

UNITED STATES PATENTS

| Number | Name | Date |
|---|---|---|
| 2,189,184 | Simpson | Feb. 6, 1940 |
| 2,310,974 | Lumm | Feb. 16, 1943 |
| 2,332,725 | Jordan | Oct. 26, 1943 |